United States Patent
Michael et al.

[19]

[11] Patent Number: 6,137,893
[45] Date of Patent: *Oct. 24, 2000

[54] MACHINE VISION CALIBRATION TARGETS AND METHODS OF DETERMINING THEIR LOCATION AND ORIENTATION IN AN IMAGE

[75] Inventors: David Michael, Newton; Aaron Wallack, Natick, both of Mass.

[73] Assignee: Cognex Corporation, Natick, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/726,521

[22] Filed: Oct. 7, 1996

[51] Int. Cl.$^7$ .................................................. G06K 9/00
[52] U.S. Cl. ........................... 382/103; 348/87; 356/363; 382/151; 382/199; 382/291
[58] Field of Search .................................... 382/206, 124, 382/290, 281, 108, 141, 143, 144, 145, 147, 148, 149, 151, 152, 199, 216, 266, 274, 282; 356/363; 395/94; 348/87

[56] References Cited

U.S. PATENT DOCUMENTS

| | | | |
|---|---|---|---|
| 3,816,722 | 6/1974 | Sakoe et al. | 364/728.05 |
| 3,936,800 | 2/1976 | Ejiri et al. | 382/205 |
| 3,967,100 | 6/1976 | Shimomura | 364/735 |
| 3,968,475 | 7/1976 | McMahon | 364/735 |
| 3,978,326 | 8/1976 | Shimomura | 364/735 |
| 4,011,403 | 3/1977 | Epstein et al. | 348/370 |
| 4,115,702 | 9/1978 | Nopper | 250/559.2 |
| 4,115,762 | 9/1978 | Akiyama et al. | 282/151 |
| 4,183,013 | 1/1980 | Agrawala et al. | 382/173 |
| 4,200,861 | 4/1980 | Hubach et al. | 382/216 |
| 4,254,400 | 3/1981 | Yoda et al. | 382/194 |
| 4,300,164 | 11/1981 | Sacks | 348/251 |
| 4,385,322 | 5/1983 | Hubach et al. | 348/243 |
| 4,441,124 | 4/1984 | Heebner et al. | 348/126 |
| 4,441,206 | 4/1984 | Kuniyoshi et al. | 382/287 |

(List continued on next page.)

FOREIGN PATENT DOCUMENTS

| | | |
|---|---|---|
| 0 527 632 A2 | 2/1993 | European Pat. Off. . |
| WO 95/122137 | 8/1995 | WIPO . |
| WO 95/21376 | 8/1995 | WIPO . |
| WO 97/21189 | 6/1997 | WIPO . |
| WO 97/22858 | 6/1997 | WIPO . |
| WO 97/24692 | 7/1997 | WIPO . |
| WO 97/24693 | 7/1997 | WIPO . |

OTHER PUBLICATIONS

Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment, Communications of the ACM 24:563–573.

Newsletter from Acquity Imaging, Inc., "Remote Vision Support Package—The Phones Are Ringing!,"1 page.

(List continued on next page.)

*Primary Examiner*—Jon Chang
*Assistant Examiner*—Jayanti K. Patel
*Attorney, Agent, or Firm*—David J. Powsner; Russ Weinzimmer

[57] ABSTRACT

A machine vision method analyzes a calibration target of the type having two or more regions, each having a "imageable characteristic," e.g., a different color, contrast, or brightness, from its neighboring region(s). Each region has at least two edges—referred to as "adjoining edges"—that are linear and that are directed toward and, optionally meet at, a reference point (e.g., the center of the target or some other location of interest). The method includes generating an image of the target, identifying in the image features corresponding to the adjoining edges, fitting lines to those edges, and determining the orientation and/or position of the target from those lines.

25 Claims, 6 Drawing Sheets

U.S. PATENT DOCUMENTS

| | | | |
|---|---|---|---|
| 4,534,813 | 8/1985 | Williamson et al. | 156/212 |
| 4,541,116 | 9/1985 | Lougheed | 382/303 |
| 4,570,180 | 2/1986 | Baier et al. | 382/145 |
| 4,577,344 | 3/1986 | Warren et al. | 382/100 |
| 4,581,762 | 4/1986 | Lapidus et al. | 382/263 |
| 4,606,065 | 8/1986 | Beg et al. | 382/170 |
| 4,617,619 | 10/1986 | Gehly | 362/302 |
| 4,630,306 | 12/1986 | West et al. | 382/197 |
| 4,688,088 | 8/1987 | Hamazaki et al. | 348/94 |
| 4,706,168 | 11/1987 | Weisner | 362/18 |
| 4,724,330 | 2/1988 | Tuhro | 356/375 |
| 4,728,195 | 3/1988 | Silver | 356/394 |
| 4,730,260 | 3/1988 | Mori et al. | 345/435 |
| 4,731,858 | 3/1988 | Grasmueller et al. | 382/151 |
| 4,736,437 | 4/1988 | Sacks et al. | 382/216 |
| 4,742,551 | 5/1988 | Deering | 382/170 |
| 4,764,870 | 8/1988 | Haskin | 348/443 |
| 4,771,469 | 9/1988 | Wittenburg | 382/203 |
| 4,783,826 | 11/1988 | Koso | 382/147 |
| 4,783,828 | 11/1988 | Sadjadi | 382/170 |
| 4,783,829 | 11/1988 | Miyakawa et al. | 382/199 |
| 4,831,580 | 5/1989 | Yamada | 345/433 |
| 4,860,374 | 8/1989 | Murakami et al. | 382/151 |
| 4,860,375 | 8/1989 | McCubbrey et al. | 382/303 |
| 4,876,457 | 10/1989 | Bose | 250/559.05 |
| 4,876,728 | 10/1989 | Roth | 382/153 |
| 4,903,218 | 2/1990 | Longo et al. | 345/332 |
| 4,907,169 | 3/1990 | Lovoi | 395/94 |
| 4,914,553 | 4/1990 | Hamada et al. | 362/560 |
| 4,922,543 | 5/1990 | Anlbom et al. | 382/291 |
| 4,926,492 | 5/1990 | Tanaka et al. | 382/168 |
| 4,932,065 | 6/1990 | Feldgajer | 382/177 |
| 4,953,224 | 8/1990 | Ichinose et al. | 382/170 |
| 4,955,062 | 9/1990 | Terui | 382/144 |
| 4,959,898 | 10/1990 | Landman et al. | 29/705 |
| 4,962,423 | 10/1990 | Yamada et al. | 382/144 |
| 4,972,359 | 11/1990 | Silver et al. | 364/782.05 |
| 4,982,438 | 1/1991 | Usami et al. | 382/154 |
| 5,012,402 | 4/1991 | Akiyama | 364/192 |
| 5,027,419 | 6/1991 | Davis | 382/206 |
| 5,046,190 | 9/1991 | Daniel et al. | 382/303 |
| 5,054,096 | 10/1991 | Beizer | 382/305 |
| 5,060,276 | 10/1991 | Morris et al. | 382/151 |
| 5,063,608 | 11/1991 | Siegel | 382/239 |
| 5,073,958 | 12/1991 | Imme | 382/267 |
| 5,081,656 | 1/1992 | Baker et al. | 378/21 |
| 5,081,689 | 1/1992 | Meyer et al. | 382/199 |
| 5,086,478 | 2/1992 | Kelly-Mahaffey et al. | 382/151 |
| 5,090,576 | 2/1992 | Menten | 209/587 |
| 5,091,861 | 2/1992 | Geller et al. | 364/474.34 |
| 5,091,968 | 2/1992 | Higgins et al. | 382/220 |
| 5,093,867 | 3/1992 | Hori et al. | 382/141 |
| 5,113,565 | 5/1992 | Cipolla et al. | 29/25.01 |
| 5,115,309 | 5/1992 | Hang | 348/388 |
| 5,119,435 | 6/1992 | Berkin | 382/135 |
| 5,124,622 | 6/1992 | Kawamura et al. | 318/569 |
| 5,133,022 | 7/1992 | Weideman | 382/172 |
| 5,134,575 | 7/1992 | Takagi | 382/145 |
| 5,143,436 | 9/1992 | Baylor et al. | 362/582 |
| 5,145,432 | 9/1992 | Midland et al. | 445/3 |
| 5,151,951 | 9/1992 | Ueda et al. | 382/156 |
| 5,153,925 | 10/1992 | Tanioka et al. | 382/272 |
| 5,159,281 | 10/1992 | Hedstrom et al. | 329/312 |
| 5,159,645 | 10/1992 | Kumagai | 382/198 |
| 5,164,994 | 11/1992 | Bushroe | 382/150 |
| 5,168,269 | 12/1992 | Harlan | 345/145 |
| 5,179,419 | 1/1993 | Palmquist et al. | 356/73.1 |
| 5,185,855 | 2/1993 | Kato et al. | 345/429 |
| 5,189,712 | 2/1993 | Kajiwara et al | 382/221 |
| 5,206,820 | 4/1993 | Ammann et al. | 702/185 |
| 5,216,503 | 6/1993 | Paik | 348/390 |
| 5,225,940 | 7/1993 | Ishii et al. | 359/823 |
| 5,230,027 | 7/1993 | Kikuchi | 382/147 |
| 5,243,607 | 9/1993 | Masson et al. | 395/185.02 |
| 5,253,306 | 10/1993 | Nishio | 382/112 |
| 5,253,309 | 10/1993 | Johnson | 382/304 |
| 5,265,173 | 11/1993 | Griffin et al. | 382/103 |
| 5,271,068 | 12/1993 | Ueda et al. | 382/216 |
| 5,287,449 | 2/1994 | Kojima | 345/161 |
| 5,297,238 | 3/1994 | Wang et al. | 395/94 |
| 5,297,256 | 3/1994 | Wolstenholme et al. | 702/183 |
| 5,299,269 | 3/1994 | Gaborski et al. | 382/156 |
| 5,311,598 | 5/1994 | Bose et al. | 382/149 |
| 5,315,388 | 5/1994 | Shen et al. | 348/718 |
| 5,319,457 | 6/1994 | Nakahashi et al. | 348/387 |
| 5,327,156 | 7/1994 | Masukane et al. | 345/113 |
| 5,329,469 | 7/1994 | Watanabe | 395/94 |
| 5,337,267 | 8/1994 | Colavin | 364/753 |
| 5,363,507 | 11/1994 | Nakayama et al. | 345/331 |
| 5,367,439 | 11/1994 | Mayer et al. | 362/551 |
| 5,367,667 | 11/1994 | Wahlquist et al. | 395/183.08 |
| 5,371,690 | 12/1994 | Engel et al. | 382/151 |
| 5,388,197 | 2/1995 | Rayner | 345/328 |
| 5,388,252 | 2/1995 | Dreste et al. | 395/183.22 |
| 5,398,292 | 3/1995 | Aoyama | 382/199 |
| 5,432,525 | 7/1995 | Maruo et al. | 345/2 |
| 5,440,699 | 8/1995 | Farrand et al. | 345/329 |
| 5,455,870 | 10/1995 | Sepai et al. | 382/147 |
| 5,455,933 | 10/1995 | Schieve et al. | 395/183.03 |
| 5,471,312 | 11/1995 | Watanabe et al. | 358/296 |
| 5,475,766 | 12/1995 | Tsuchiya et al. | 382/144 |
| 5,477,138 | 12/1995 | Efjavic et al. | 324/158.1 |
| 5,481,712 | 1/1996 | Silver et al. | 395/701 |
| 5,485,570 | 1/1996 | Bushboom et al. | 345/329 |
| 5,491,780 | 2/1996 | Fyles | 345/332 |
| 5,495,424 | 2/1996 | Tokura | 702/82 |
| 5,495,537 | 2/1996 | Bedrosian et al. | 382/209 |
| 5,519,840 | 5/1996 | Matias et al. | 707/101 |
| 5,526,050 | 6/1996 | King et al. | 348/387 |
| 5,532,739 | 7/1996 | Garakani et al. | 348/87 |
| 5,550,763 | 8/1996 | Michael | 702/155 |
| 5,553,859 | 9/1996 | Kelly et al. | 273/338 |
| 5,557,410 | 9/1996 | Huber et al. | 356/376 |
| 5,566,877 | 10/1996 | McCormack | 228/105 |
| 5,568,563 | 10/1996 | Tanaka et al. | 382/144 |
| 5,574,668 | 11/1996 | Beaty | 702/150 |
| 5,574,801 | 11/1996 | Collet-Beillon | 382/150 |
| 5,583,949 | 12/1996 | Smith et al. | 382/194 |
| 5,583,954 | 12/1996 | Garakani | 382/278 |
| 5,583,956 | 12/1996 | Aghajan et al. | 382/290 |
| 5,592,562 | 1/1997 | Rooks | 382/150 |
| 5,594,859 | 1/1997 | Palmer et al. | 345/330 |
| 5,602,937 | 2/1997 | Bedrosian et al. | 382/151 |
| 5,608,872 | 3/1997 | Schwartz et al. | 395/200.35 |
| 5,613,013 | 3/1997 | Schuette | 382/124 |
| 5,640,199 | 6/1997 | Garakani et al. | 348/87 |
| 5,640,200 | 6/1997 | Michael | 348/87 |
| 5,846,318 | 12/1998 | Javidi | 117/14 |

OTHER PUBLICATIONS

PictureTel Corporation Product Brochure "Picturetel Live PCS 100(tm) Personal Visual Communications System," 3pp. (1993).

PictureTel Corporation Product Brochure "Picturetel System 1000: Complete Videoconferencing for Cost Sensitive Applications," 4pp. (1993).

PictureTel Corporation Product Brochure, "Picturetel System 4000(tm) A Family of Models to Fit Your Application from Offices to Boardrooms, Classrooms, and Auditoriums," 4 pp. (1993).

Symantec Corporation, "The Norton pcAnywhere User's Guide," Table of Contents 8 pp; Introduction of pcAnywhere Technology pp i–vii; Chapter 7 –Sessions; pp. 191–240 (1991).

Bursky, Dave, "CMOS Four–Chip Set Process Images at 20–MHz Data Rates," Electronic Design, May 28, 1987, PP. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robot Vision", The Massachusetts Institute for Technology, 1986.

Rosenfeld, Azriel. "Computer Vision: Basic Principles," Proceedings of the IEEE. vol. 76, No. 8, Aug. 1988. pp. 863–868.

MACHINE VISION CALIBRATION TARGETS AND METHODS OF DETERMINING THEIR LOCATION AND ORIENTATION IN AN IMAGE

RESERVATION OF COPYRIGHT

The disclosure of this patent document contains material which is subject to copyright protection. The owner thereof has no objection to facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The invention pertains to machine vision and, more particularly, to calibration targets and methods for determining their location and orientation in an image.

Machine vision refers to the automated analysis of an image to determine characteristics of objects and other features shown in the image. It is often employed in automated manufacturing lines, where images of components are analyzed to determine placement and alignment prior to assembly. Machine vision is also used for quality assurance. For example, in the pharmaceutical and food packing industries, images of packages are analyzed to insure that product labels, lot numbers, "freshness" dates, and the like, are properly positioned and legible.

In many machine vision applications, it is essential that an object whose image is to be analyzed include a calibration target. Often a cross-shaped symbol, the target facilitates determining the orientation and position of the object with respect to other features in the image. It also facilitates correlating coordinate positions in the image with those in the "real world," e.g., coordinate positions of a motion stage or conveyor belt on which the object is placed. A calibration target can also be used to facilitate determining the position and orientation of the camera with respect to the real world, as well as to facilitate determining the camera and lens parameters such as pixel size and lens distortion.

In addition to cross-shaped marks, the prior art suggests the use of arrays of dots, bulls-eyes of concentric circles, and parallel stripes as calibration targets. Many of these targets have characteristics that make difficult finding their centers and orientations. This typically results from lack of clarity when the targets and, particularly, their borders are imaged. It also results from discrepancies in conventional machine vision techniques used to analyze such images. For example, the edges of a cross-shaped target may be imprecisely defined in an image, leading a machine vision analysis system to wrongly interpret the location of those edges and, hence, to misjudge the mark's center by a fraction of a pixel or more. By way of further example, a localized defect in a camera lens may cause a circular calibration mark to appear as an oval, thereby, causing the system to misjudge the image's true aspect ratio.

In addition to the foregoing, many of the prior art calibration targets are useful only at a limited range of magnifications. Parallel stripes, for example, do not provide sufficient calibration information unless many of them appear in an image. To accommodate this, a machine vision system must utilize lower magnification. However, as the magnification decreases, so does the ability of the machine vision equipment to distinguish between individual stripes. Similar drawbacks limit the usefulness of the other prior art calibration targets for use in all but a narrow range of magnifications.

Though the art suggests the use of checkerboard patterns as alignment marks, the manner in which images of those marks are analyzed by conventional machine systems also limits their utility to a limited range of magnifications. Particularly, prior art systems obtain alignment information from checkerboard marks by identifying and checking their corners, e.g., the eight black (or white) corners in a black-and-white image. By relying on corners, the systems necessitate that images show entire checkerboards, yet, with sufficient resolution to insure accurate detection and analysis.

An object of this invention is to provide an improved calibration targets and methods for machine vision analysis thereof.

A related object is to provide calibration targets and analysis methods reliable at a wide range of magnifications.

A further object is to provide such methods as can be readily implemented on conventional digital data processors or other conventional machine vision analysis equipment.

Yet still another object of the invention is to provide such methods that can rapidly analyze images of calibration target without undue consumption of resources.

SUMMARY OF THE INVENTION

The foregoing objects are among those attained by the invention, which provides in one aspect a machine vision method for analysis of a calibration target of the type having two or more regions, each having a different "imageable characteristic" (e.g., a different color, contrast, or brightness) from its neighboring region(s). Each region has at least two edges—referred to as "adjoining edges"—that are linear and that are directed toward and, optionally meet at, a reference point (e.g., the center of the target or some other location of interest). The method includes generating an image of the target, identifying in the image features corresponding to the adjoining edges, and determining the orientation and/or position of the target from those edges.

In another aspect, the invention provides a method as described above for analyzing a target of the type that includes four regions, where the adjoining edges of each region are perpendicular to one another, and in which each region in the target has a different imageable characteristic from its edge-wise neighbor. The edges of those regions can meet, for example, at the center of the target, as in the case of a four-square checkerboard.

In yet another aspect, the invention provides a method as described above for determining an orientation of the target as a function of the angle of the edges identified in the image and for determining the location of the reference point as an intersection of lines fitted to those edges. In regard to the former, the invention provides a method of determining the orientation of a target in an image by applying a Sobel edge tool to the image to generate a Sobel angle image, and by generating a angle histogram from that angle image. In an alternate embodiment, the orientation is determined by applying a Hough line tool to the image and determining the predominant angle of the edges identified by that tool.

In regard to the location of the reference point, one aspect of the invention calls for locating the adjoining edges by applying a caliper vision tool to the image, beginning at an approximate location of the reference point. That approximate location of the reference point can itself be determined by applying a Hough line vision tool to the image in order to find lines approximating the adjoining edges and by determining an intersection of those lines. Alternatively, the approximate location of the reference point can be determined by performing a binary or grey scale correlation to find where a template representing the edges most closely matches the image.

In another alternate embodiment, the approximate location of the reference point is determined by applying a projection vision tool to the image along each of the axes with which the adjoining edges align. A first difference operator vision tool and a peak detector vision tool are applied to the output of the projection tool (i.e., to the projection) in order to find the approximate location of the edges.

The invention has wide application in industry and research applications. It facilitates the calibration of images by permitting accurate determination of target location and orientation, regardless of magnification. Thus, for example, an object bearing a target can be imaged by multiple cameras during the assembly process, with accurate determinations of location and orientation made from each such image.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1A:
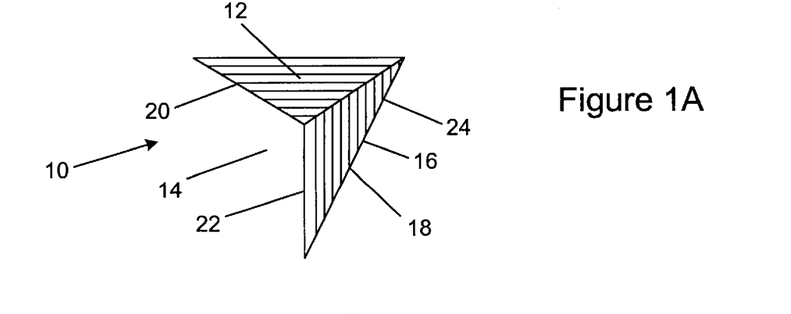
FIG. 1A–1C depict calibration targets according to the invention.
Figure 1B:
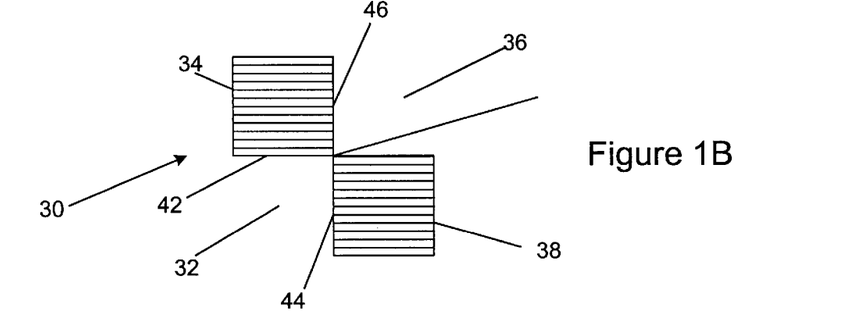
Figure 1C:
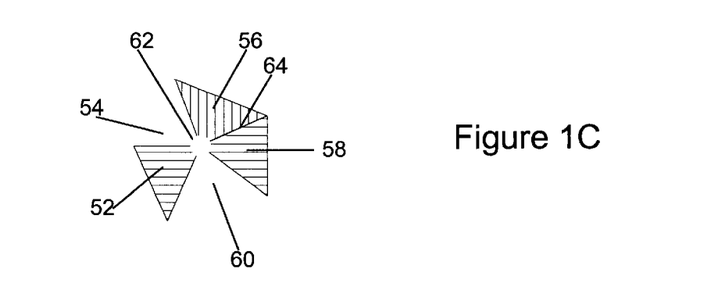

FIGS. 1A–1C depict calibration targets according to the invention. Referring to FIG. 1A, there is shown a target 10 according to the invention having three regions 12, 14, 16. Each region is bounded by at least two linear edges that are oriented toward a reference location or reference point 18 on the target. Thus, for example, region 12 is bounded by edges 20, 24; region 14 is bounded by edges 20, 22; and region 16 is bounded by edges 22, 24. As evident in the drawings, the edges are shared by adjoining regions and, hence, are referred to below as "adjoining edges." Thus, region 12 shares edge 20 with region 14; region 14 shares edge 22 with region 16; and region 16 shares edge 24 with region 12. In the illustration, the reference point 14 is at the center of target 10, though, those skilled in the art will appreciate that the reference point can be positioned elsewhere.

Each of the regions has a different imageable characteristic from its neighboring regions. As used herein, an "imageable characteristic" is a characteristic of a region as imaged by a machine vision system (e.g., of the type shown in FIG. 3) and, particularly, as imaged by an image capture device used by such a system. For example, in the illustration, region 12 has the characteristic of being colored black; region 14, white; and region 16, gray. In addition to color, imageable characteristics useful with conventional machine vision systems—which typically utilize image capture devices operational in visual spectrum—include contrast, brightness, and stippling.

Those skilled in the art will appreciate that any other characteristics by which a region may be identified and distinguished in an image are suitable for practice of the invention. Thus, for example, for a machine vision system that utilizes a temperature-sensitive (or infrared) image capture device, an imageable characteristic is temperature. By way of further example, for a machine vision system that utilizes a nuclear decay radiation-sensitive image capture device, an imageable characteristic is emitted radiation intensity or frequency.

As shown in the illustration, the adjoining edges 20, 22, 24 comprise straight linear segments. Those edges are implicitly defined as the borders between regions that, themselves, have different imageable characteristics. Thus, for example, edge 20 is a straight linear segment defined by the border between black region 12 and white region 14. Likewise, edge 24 is defined by the border between black region 12 and gray region 16. Further, edge 22 is defined by the border between white region 14 and grey region 16.

FIG. 1B depicts a calibration target 30 according to the invention having four rectangular (and, more particularly, square) regions 32, 34, 36, 38. As above, each region is bounded by at least two linear edges that are oriented toward a reference point 40 at the center of the target. Thus, for example, region 32 is bounded by edges 42, 44; region 34 is bounded by edges 42, 46; and so forth. As above, these edges are shared by adjoining regions. Thus, region 32 shares edge 42 with region 34, and so forth. Each region in target 30 has a different imageable characteristic from its edge-wise neighbor. Hence, regions 32 and 36 are white, while their edge-wise adjoining neighbors 34, 38 are black.

FIG. 1C depicts a calibration target 50 according to the invention having five regions 52, 54, 56, 58, 60, each having two linear edges directed toward a reference point 62. The adjoining regions are of differing contrast, thereby, defining edges at their common borders, as illustrated. Although the edges separating the regions 52–60 of target 50 are directed toward the reference point 62, they do not meet at that location. As evident in FIG. 1C, no marker or other element imageable characteristic is provided at reference point 62.

Those skilled in the art will appreciate that, in addition to the calibration targets shown in FIGS. 1A–1C, targets with still more regions (or as few as two regions) and shapes, otherwise in accord with the teachings hereof, fall within the scope of the invention. Moreover, it will be appreciated that targets may be of any size and that their regions need not be of uniform size. Still further, it will be appreciated that the outer borders of the targets need not be linear and may, indeed, take on any shape.

Figure 2:
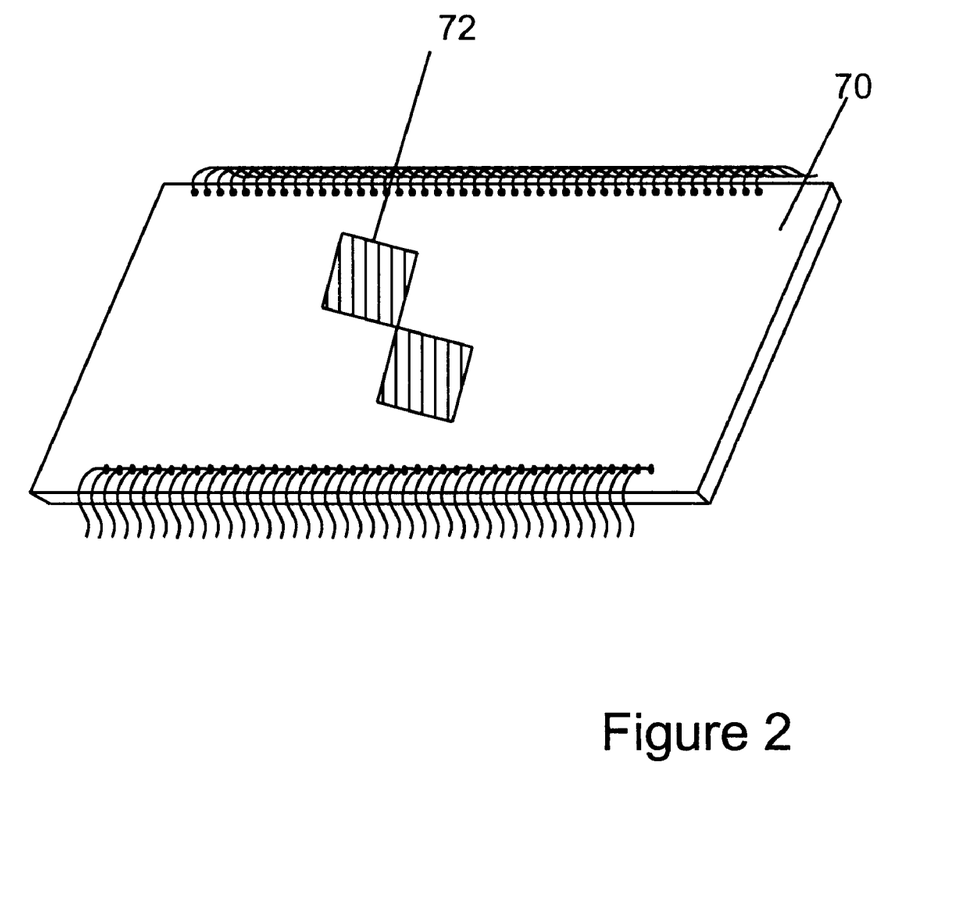
FIG. 2 depicts an object according to the invention incorporating a calibration target of the type depicted in FIG. 1B.

FIG. 2 depicts an object according to the invention for use in machine vision imaging, detection, and/or manipulation having a calibration target according to the invention coupled thereto. In the illustration, the object is an integrated circuit chip 70 having coupled to the casing thereof a calibration target 72 of the type shown in FIG. 1B. Other targets according to the invention, of course, can likewise be coupled to the object 70. The targets can be coupled to the object by any known means. For example, they can be molded onto, etched into, or printed on the surface of the object. By way of further example, decals embodying the targets can be glued, screwed or otherwise affixed to the object. Moreover, by way of still further example, calibration plates incorporating the targets can be placed on the object and held in place by friction. In addition to integrated circuit chips, the object can include any other objects to which a target can be coupled, such as printed circuit boards, electrical components, mechanical parts, containers, bottles, automotive parts, paper goods, etc.

Figure 3:
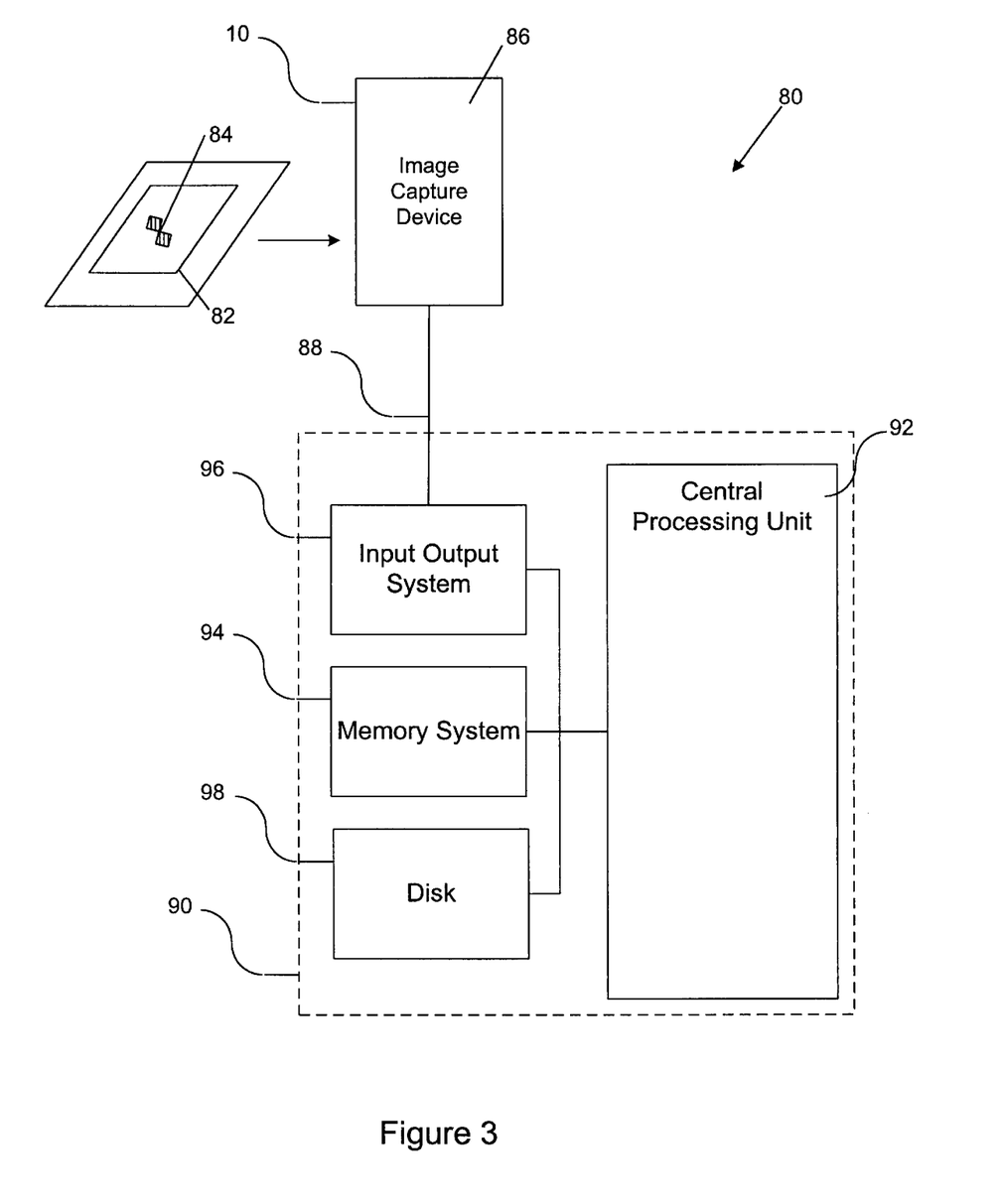
FIG. 3 depicts a machine vision system according to the invention for determining the reference point and orientation of a calibration target.

FIG. 3 depicts a machine vision system 80 according to the invention for determining the reference point and orientation of an object 82 having coupled thereto a calibration target 84 according to the invention and, particularly, a four-region target of the type shown in FIG. 1B. The system 80 includes an image capture device 86 that generates an image of a scene including object 82. Although the device may be responsive to the visual spectrum, e.g., a conventional video camera or scanner, it may also be responsive to emissions (or reflections) in other spectra, e.g., infrared, gamma-ray, etc. Digital image data (or pixels) generated by the capturing device 86 represent, in the conventional manner, the image intensity (e.g., contrast, color, brightness) of each point in the field of view of the capturing device.

That digital image data is transmitted from capturing device 86 via a communications path 88 to an image analysis system 90. This can be a conventional digital data processor, or a vision processing system of the type commercially available from the assignee hereof, Cognex Corporation, as programmed in accord with the teachings hereof to determine the reference point and orientation of a target image. The image analysis system 90 may have one or more central processing units 92, main memory 94, input-output system 96, and disk drive (or other mass storage device) 98, all of the conventional type.

Figure 4:
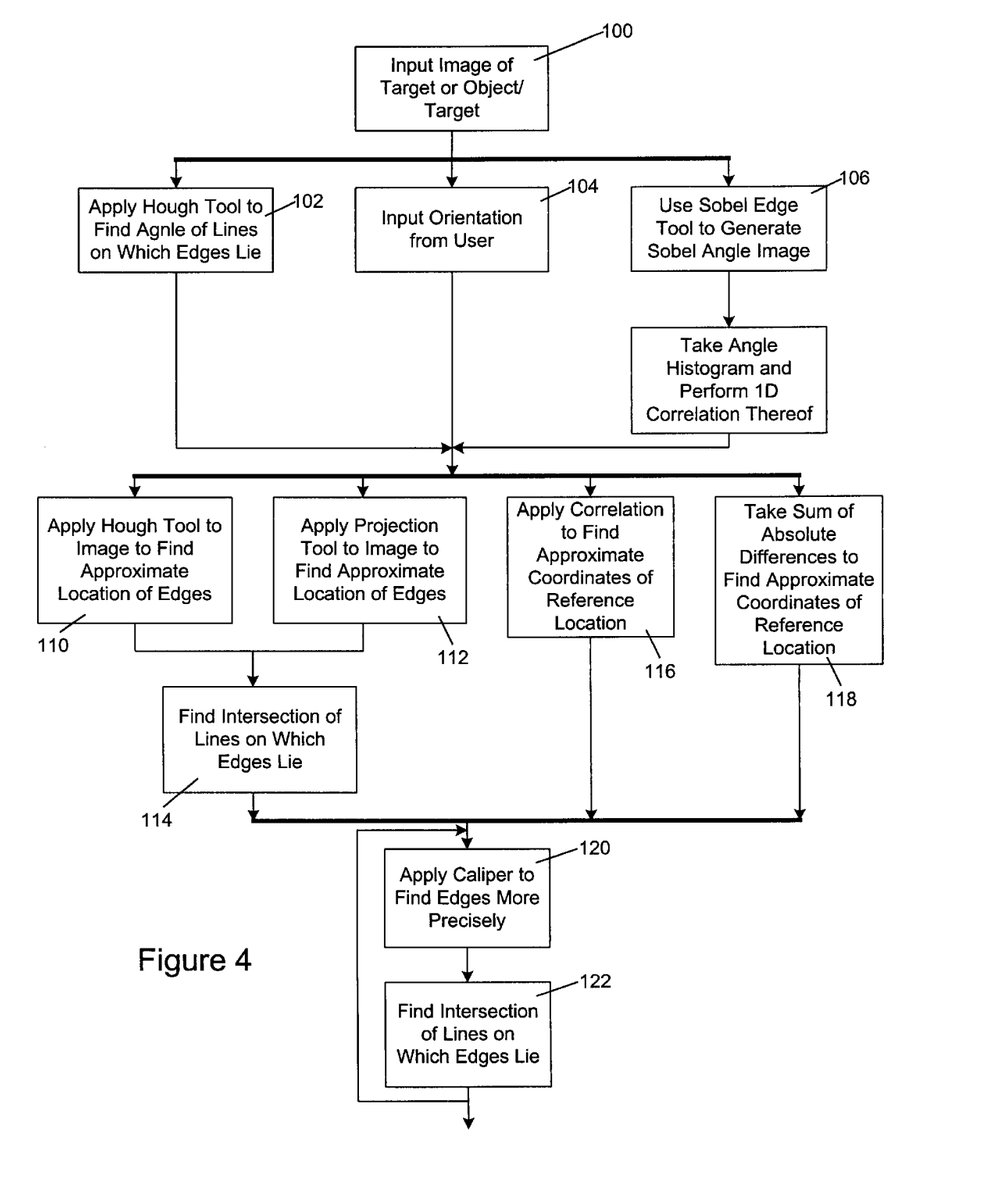
FIGS. 4 and 5 depict a method according to the invention for interpreting an image of a calibration target to determine a reference point and orientation thereof.

The system 90 and, more particularly, central processing unit 92, is configured by programming instructions according to teachings hereof for operation as illustrated in FIG. 4 and described below. Those skilled in the art will appreciate that, in addition to implementation on a programmable digital data processor, the methods and apparatus taught herein can be implemented in special purpose hardware.

Referring to FIG. 4 there is shown a machine methodology according to the invention for interpreting an image of a target 84 to determine its reference point and orientation. The discussion that follows is particularly directed to identifying a four-region target of the type shown in FIG. 1B. Those skilled in the art will appreciate that these teachings can be readily applied to finding targets according to the invention, as well as to other targets having detectable linear edges that are oriented toward a reference location or reference point on the target, e.g., a prior art cross-shaped target. For convenience, in the discussion that follows, such linear edges are referred to as "adjoining edges," regardless of whether they are from calibration targets according to the invention or from prior art calibration targets.

In step 100, an image of the target 84 (or of the target 84 and object 82) is generated, e.g., using image capture device 86, and input for machine vision analysis as discussed below. The image can be generated real time, retrieved from a storage device (such as storage device 98), or received from any other source.

In steps 102–108, the method estimates the orientation of the target in the image using any of many alternative strategies. For example, as shown in step 102, the method determines the orientation by applying a conventional Hough line vision tool that finds the angle of edges discernable in the image. In instances where the target occupies the entire image, those lines will necessarily correspond to the adjoining edges. Where, on the other hand, the target occupies only a portion of the image, extraneous edges (e.g., from other targets) may be evident in the output of that tool. Although those extraneous edges can generally be ignored, in instances where they skew the results, the image can be windowed so that the Hough vision tool is only applied to that portion that contains the target. Once the angles of the lines has been determined by the Hough line tool, the orientation of the image is determined from the predominant ones of those angles. Alternatively, the angle of the image can be determined by taking a histogram of the angles.

The Hough vision tool used in step 102 may be of the conventional type known and commercially available for finding the angle of lines in image. A preferred such tool is the Cognex Line Finder, commercially available from the Assignee hereof, Cognex Corporation. A further discussion of that preferred tool is provided in the Appendix filed herewith.

An alternative to using a Hough vision tool is shown in step 106. There, the illustrated method determines the orientation of the target by applying a Sobel edge tool to the image to find the adjoining edges. Particularly, that tool generates a Sobel angle image that reveals the direction of edges in the image. As above, where the target occupies the entire image, the adjoining edges will be the only ones discerned by the Sobel edge tool image. Where, on the other hand, the target occupies only a portion of the image, any extraneous edges can be ignored or windowed out.

The Sobel edge tool may be of the conventional type known and commercially available for finding lines in image. A preferred such tool is the Cognex Edge Detection tool, commercially available from the Assignee hereof, Cognex Corporation. A further discussion of that preferred tool is provided in the Appendix filed herewith.

Once the Sobel angle image is generated, in step 106, the orientation of the target in the image is determined by generating a histogram of the edge angle information; see, step 108. From that histogram, the target orientation can be determined by taking a one-dimensional correlation of that histogram with respect to a template histogram of a target oriented at 0°. Where a Sobel magnitude image is generated, in addition to the Sobel angle image, such a histogram can be generated by counting the number of edges greater then a threshold length at each orientation.

As a still further alternative to applying a Hough vision tool or Sobel edge tool, the method contemplates obtaining the angle of orientation of the target from the user (or operator). To this end, the user may enter angle orientation information via a keyboard or other input device coupled with digital data processor 90.

In steps 110–118, the method determines the location, i.e., coordinates, of the target reference point in the image. Particularly, in step 110, the method can apply a Hough vision tool, as described above, to find the angle of lines discernable in the image. A conventional Hough vision tool determines, in addition to the angle of lines in an image, the distance of each line, e.g., from a central pixel. As above, where the target occupies the entire image, those lines will be the only ones discernable by the Sobel edge tool image. Where, on the other hand, the target occupies only a portion of the image, any extraneous edges can be ignored or windowed out.

As above, the Hough vision tool used in step 104 may be of the conventional type known and commercially available for finding the angle and position of lines in image. Once again, a preferred such tool is the Cognex Line Finder, commercially available from the Assignee hereof, Cognex Corporation. A further discussion of that preferred tool is provided in the Appendix filed herewith. Those skilled in the art will, of course, appreciate that steps 102 and 110 can be combined, such that a single application of the Hough vision tool provides sufficient information from which to determine both the orientation of the target in the image and its reference point.

As an alternative to using a Hough vision tool, the method can apply a projection vision tool to the image in order to find the position of the lines discernable in the image; see, step 112. The projection tool, which maps the two-dimensional image of the target into a one-dimensional image, is applied along the axes defined by the edges in the image. As those skilled in the art will appreciate, the location of the edges can be discerned from by finding the peaks in the first derivatives of each of those projections. As above, where the target occupies the entire image, those lines will be the only lines discernable by the Sobel edge tool image. Where, on the other hand, the target occupies only a portion of the image, any extraneous edges can be ignored or windowed out.

The projection vision tool used in step 112 may be of the conventional type known and commercially available for mapping a two-dimensional image of the target into a one-dimensional image. A preferred such tool is that provided with the Cognex Caliper tool commercially available from the Assignee hereof, Cognex Corporation. A further discussion of that preferred tool is provided in the Appendix filed herewith.

In step 114, the method uses the information generated in steps 110 and 112 to compute the location of the reference point, particularly, as the intersection of the lines found in those steps 110 and 112.

As an alternative to using the Hough vision tool and the projection tool, the method can apply determine the location of the reference point by performing a binary or grey scale correlation on the image; see step 116. To this end, the method uses, as a template, a pattern matching the expected arrangement of the sought-after edges, to wit, a cross-shaped pattern in the case of a target of the type shown in FIG. 1B. The use of correlation vision tools for this purpose is well known in the art. The template for such an operation is preferably generated artificially, although it can be generated from prior images of similar targets.

As still another alternate to the Hough vision tool and the projection tool, the method can apply a grey-scale image registration using the sum of absolute differences metric between the image and a template; see step 118. To this end, the method uses, as a template, a pattern matching the expected arrangement of the sought-after edges, to wit, a cross-shaped pattern in the case of a target of the type shown in FIG. 1B. The template for such an operation is preferably generated artificially, although it can be generated from prior images of similar targets. A preferred grey-scale image registration tool is disclosed in U.S. Pat. No. 5,548,326, the teachings of which are incorporated herein by reference.

Although steps 110–118 can be used to determine the approximate location of the reference point of the target in the image, the method utilizes optional steps 120 and 122 to refine that estimate. These two steps are invoked one or more times (if at all) in order make that refinement.

In step 120, the method applies a conventional caliper vision tool to find points in the image that define the adjoining edges of the regions. On the first invocation of step 120, the method applies calipers along fifty points along each edge (though those skilled in the art will appreciate that other numbers of points can be used), beginning with points closest to the estimate of the reference point, as discerned in steps 110–118. The calipers are preferably applied a small distance away from the actual estimate of the reference point to avoid skewing the analysis due to possible misprinting of the target at that point, a missing pattern at that point (e.g., FIG. 1C), or a too-high spatial frequency at that point (e.g., FIG. 1B). In step 120, the method then fits a line to the points found along each edge by the caliper tool, preferably, using a conventional least squares technique.

In step 122, the method computes a refined location of the reference point as the intersection of the lines identified in step 120. Although conventional geometric calculations can be performed for this purpose, preferably, the reference point is computed using conventional least squares techniques. Preferably, when examining the image of a symmetric calibration target of the type shown in FIG. 1B, the method utilizes the same number of points on either side of (and closest to) the reference point for purposes of fitting each line. This minimizes the bias otherwise introduced by a conventional edge detection technique in finding edges that are defined only by dark-to-light (or light-to-dark) transitions.

Calibration targets of the type shown in FIG. 1B are advantageously processed by a method according to the invention insofar as they further minimize bias otherwise introduced by a conventional edge detection techniques. In this regard, it will be appreciated that such bias is reduced by the fact that "opposing" adjoining edges (i.e., edges that oppose one another across the reference point) define straight linear segments that change polarity across the reference point. That is, those segments are defined by regions that transition—preferably, equally in magnitude— from light-to-dark one one side of the reference point, and from dark-to-light on the other side. This is true for all "symmetric" calibration targets according to the invention, i.e., targets in which opposing edges define straight linear segments that are opposite polarity on either side of the reference point.

On the second and subsequent invocations of step 120, the method specifically applies the caliper tool at points along the lines found in the previous iteration. Preferably, these points are at every pixel in the image that lies along the line, though, those skilled in the art will appreciate that few points can be used. The calipers can be applied orthogonal to the lines, though, in the preferred embodiment, they are applied along the grid defined by the image pixels. The caliper range decreases with each subsequent invocation of step 120. The method continues applying the calipers, beginning at the estimated center point until one of the four following situations occurs: no edge is found by the caliper applied at the sample point; more than one edge is found by the caliper and the highest scoring edge is less than twice the score of the second highest scoring edge (this 2× comes from the CONFUSION_THRESHOLD); the distance between a computed edge point and the nominal line (computed from the previous invocation of step 120) is larger than a threshold (which threshold decreases with each subsequent invocation of step 120); or, the caliper extends outside of the image. As above, in step 120, the method then fits a line to the points found along each edge by the caliper tool, preferably, using a conventional least squares technique.

In the second and subsequent invocations of step 122, the method computes a refined location of the reference point as the intersection of the lines identified in step 120. As above, although conventional geometric calculations can be performed for this purpose, preferably, the reference point is computed using conventional least squares techniques.

Figure 5:
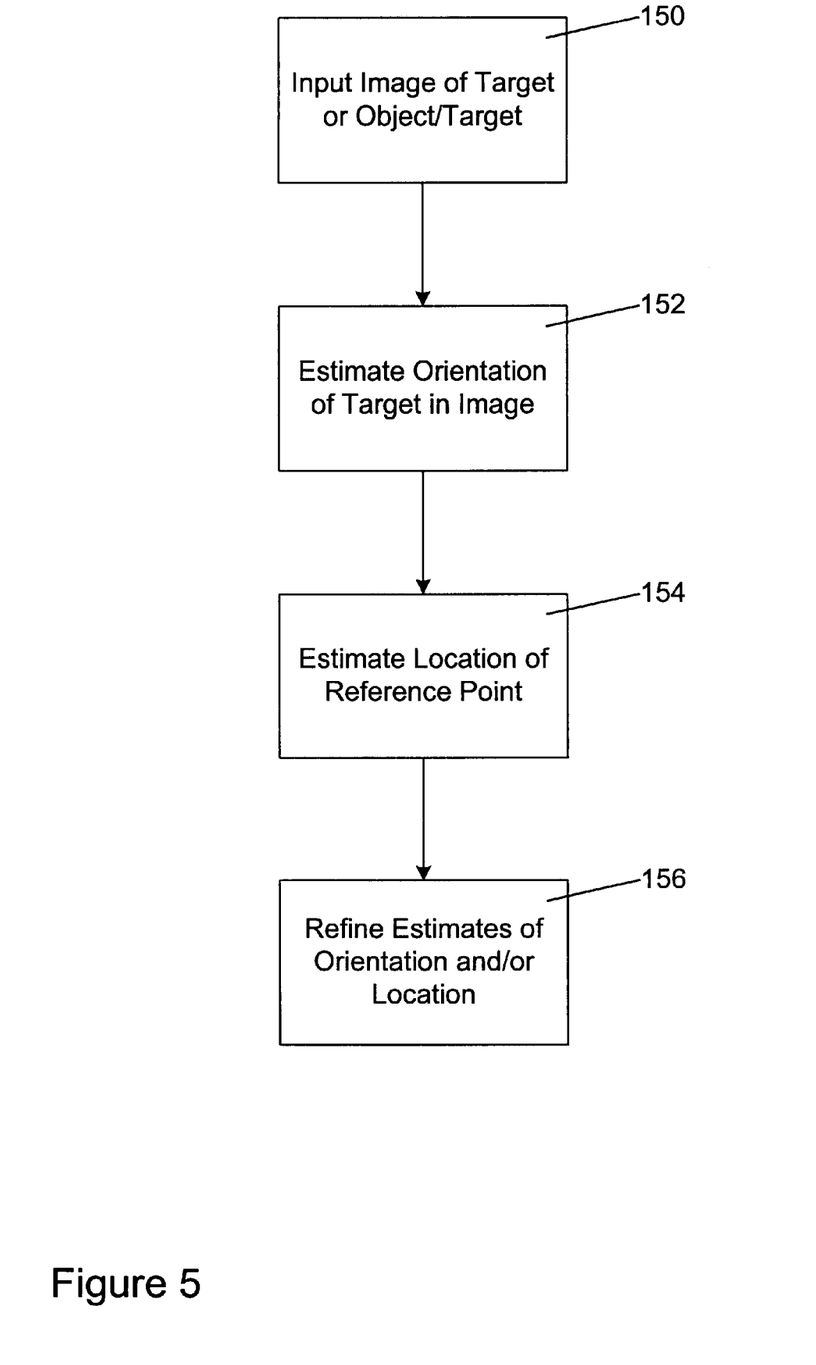

Referring to FIG. 5, there is also shown a machine methodology according to the invention for interpreting an image of a target 84 to determine its reference point and orientation. Particularly, in step 150, the method calls for generating an image of a target 84 and, particularly, of a target according to the invention having two or more regions, each region being defined by at least two linear edges that are directed toward a reference point, and having at least one of the regions having a different imageable characteristic from an adjacent region. Step 152 can be effected in the manner described in connection with step 100 of FIG. 4, or equivalents thereof.

In step 152, the method analyzes the image to generate an estimate of an orientation of the target in the image. Step 152 can be effected in the manner described in connection with steps 102–108 of FIG. 4, or equivalents thereof.

In step 154, the method analyzes the image to generate estimate of a location of the target's reference point. Step 154 can be effected in the manner described in connection with steps 110–118 of FIG. 4, or equivalents thereof.

In step 156, the method analyzes the image to refine its estimates of the location of the reference point in the image and the orientation of the target in the image. Step 156 can be effected in the manner described in connection with steps 120–122 of FIG. 4, or equivalents thereof.

Calibration target and methods for analysis according to the invention are advantageous over prior art targets and methods insofar as they are magnification invariant. By analyzing the adjoining edges of targets, methods according to the invention insure reliance on features (to wit, regions) that retain the same imageable appearance regardless of magnification. This is in contrast to prior art targets and methods, which rely on individual lines (or dots) to define calibrating features. As noted above, the imaging appearances of such lines and dots change with varying degrees of magnification. Even the prior art methods that analyze checkerboard targets rely on analysis of corners, which are not magnification invariant.

Figure 6A:
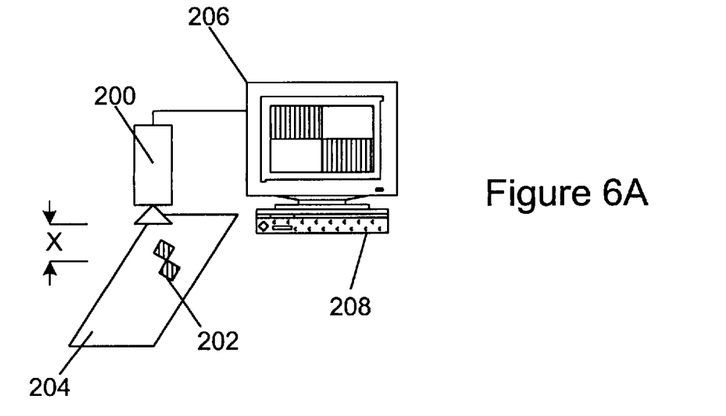
FIG. 6 illustrates the magnification invariance of a target according to the invention.
Figure 6B:
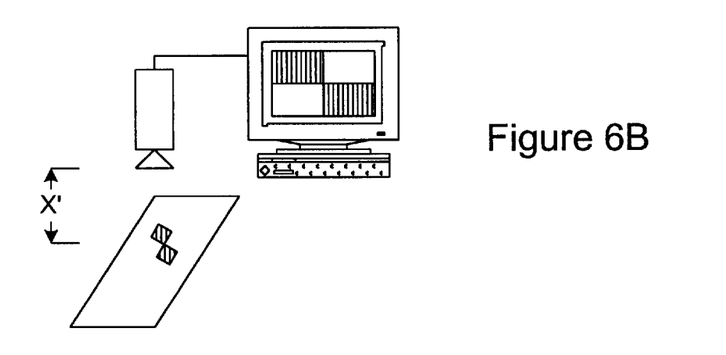
Figure 6C:
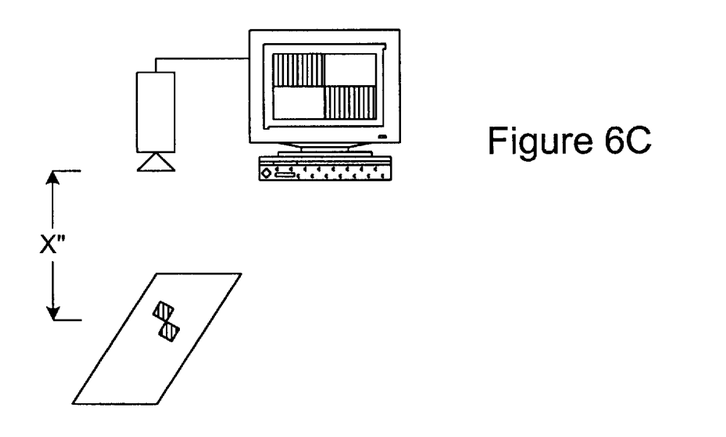

The magnification invariance of targets and methods according to the present invention is illustrated in FIGS. 6A–6C. Referring to FIG. 6A, there is shown an imaging setup wherein camera 200 images a target 202 (on object 204) from a height x. An image generated by camera 200 is displayed on monitor 206 of workstation 208. Referring to FIG. 6B, there is shown an identical imaging setup, except insofar as a camera (of identical magnification) images a target (of identical size) from a greater height, x'. Likewise, FIG. 6C shows an identical imaging setup, except insofar as a camera (again, of identical magnification) images a target (again, of identical size) from a still greater height, x". Comparing monitor images depicted in FIGS. 6A–6C, it is seen that the images of the targets, generated by the cameras and displayed on the monitors, are identical in appearance regardless of the relative heights (x, x', and x") of the camera. This magnification invariance results from the fact that the target has the same appearance regardless of height (or equivalently, magnification), within specified limits thereof. Those skilled in the art will appreciate that those limits are greater than the analagous limits for prior art targets (e.g., cross hairs, parallel stripes, etc.).

Figure 1D:
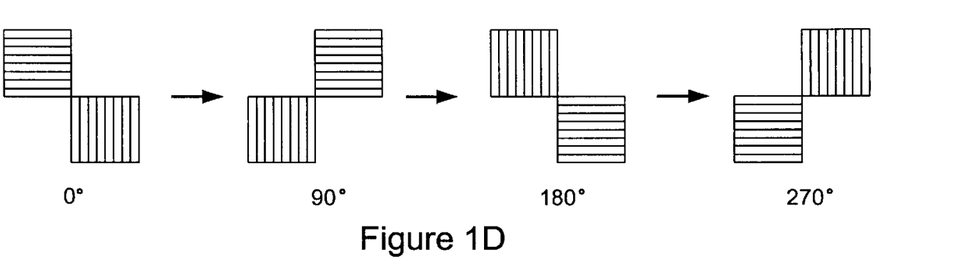
FIG. 1D depicts the effect of rotation on the target depicted FIG. 1B.

Still another advantage of calibration targets and methods according to the invention is that they permits angular orientation to be determined throughout a full 360° range. With reference to FIG. 1D, for example, the relative positions of the regions can be used to determine the overall orientation of the target, i.e., whether it is rotated 0°, 90°, 180°, or 270°. This information can be combined with a determination of relative orientation made by analysis of the adjoining edges as discussed above to determine the precise position of the target.

A further understanding of the operation of an embodiment of the invention may be attained by reference to the Appendix hereto, providing a software listing of a preferred machine vision methodology for analyzing an image containing a target.

Described herein are calibration targets and methods for determining the location and orientation thereof meeting the objects set forth above. It will be appreciated that the embodiments shown in the drawings and discussed above are merely illustrative of the invention, and that other embodiments incorporating changes therein fall within the scope of the invention, of which

We claim:

1. A machine vision method of determining a location of an object, the method comprising the steps of
   A. placing a calibration target on the object, the target comprising
      i. two or more regions, each region being defined by at least two linear edges that are directed toward a reference point;
      ii. at least one of the regions having a different imageable characteristic from an adjacent region;
   B. generating an image of at least the calibration target;
   C. identifying edges in the image corresponding to lines in the calibration target;
   D. determining a location where lines fitted to those edges intersect.

2. A method according to step 1, wherein step (C) comprises the step of identifying edges in the image by applying an edge detection vision tool to the image.

3. A method according to step 1, wherein step (C) comprises identifying edges in the image by applying a caliper vision tool to the image.

4. A method according to step 1, wherein step (C) comprises identifying edges in the image by applying a first difference operator vision tool to the image, and by applying a peak detector vision tool the an output of the first difference operator vision tool.

5. A method according to step 1, wherein step (C) comprises identifying edges in the image by applying a caliper tool to the image beginning at an approximate location of the reference point.

6. A method according to claim 5, comprising the step of determining an approximate location of the reference point by applying a Hough line vision tool to the image and finding an intersection of lines identified thereby.

7. A method according to claim 5, comprising the step of determining an approximate location of the reference point by applying a correlation vision tool to the image using a template substantially approximating an expected pattern of edges in the image.

8. A method according to claim 5, comprising the step of determining an approximate location of the reference point by applying a projection vision tool to the image along one or more axes with which the edges are expected to be aligned.

9. A method according to claim 1, comprising the steps of
   identifying edges in the image corresponding to lines in the calibration target; and
   determining an orientation of the target based on the angle of those identified edges.

10. A machine vision according to claim 1, wherein step (C) includes the step of applying a Hough line vision tool to identify edges in the image corresponding to lines in the calibration target; and the method further including the step of determining an orientation of the target based on the angle of those identified edges.

11. A machine vision according to claim 1, comprising
A. applying a Sobel edge tool to the image to generate at least a Sobel angle image; and
B. taking an angle histogram of the Sobel angle image to determine an orientation of the target.

12. A machine vision method of determining an orientation of an object, the method comprising the steps of
A. placing a calibration target on the object, the target comprising
   i. two or more regions, each region being defined by at least two linear edges that are directed toward a reference point;
   ii. at least one of the regions having a different image able characteristic from an adjacent region;
B. generating an image of at least the target;
C. identifying edges in the image corresponding to lines in the calibration target;
D. determining an orientation of the target based on the angle of those identified edges.

13. A method according to claim 12, wherein
step (C) includes applying a Hough line vision tool to the image to identify therein edges in the image corresponding to lines in the calibration target; and
step (D) includes determining an orientation of the target based on the angle of those identified edges.

14. A method according to claim 12, wherein
step (C) includes applying a Sobel edge tool to generate at least a Sobel angle image; and
step (D) includes taking an angle histogram of the Sobel angle image to determine an orientation of the target.

15. A method according to any of claims 1 or 12, wherein step (B) includes the step of generating an image of a target in which each region has any of a different color, contrast, brightness and stippling from regions adjacent thereto.

16. A method according to claim 15, for use with a machine vision system having image capture means for capturing an image of the target, wherein each region has a different characteristic in such an image than the regions adjacent thereto.

17. A method according to any of claims 1 or 12, wherein step (B) includes the step of generating an image of a target for which the reference point is at a center thereof.

18. A method according to claim 17, wherein step (B) includes the step of generating an image of a target for which the linear edges substantially meet at the reference point.

19. A method according to any of claim 1 or 12, wherein step (B) includes the step of generating in image of a target having four image able regions.

20. A method according to claim 19, wherein step (B) includes the step of generating an image of a four-region target in which the at least two linear edges of each of the regions are perpendicular to one another.

21. A machine vision method of determining a location and orientation of an object, the method comprising the steps of
A. placing a calibration target on the object, the target comprising
   i. two or more regions, each region being defined by at least two linear edges that are directed toward a reference point;
   ii. at least one of the regions having a different image able characteristic from an adjacent region;
B. generating an image of at least the target;
C. generating, based on analysis of the image, an estimate of an orientation of the target therein;
D. generating, based on analysis of the image, an estimate of a location of the reference point therein;
E. refining, based on analysis of the image, estimates of at least one of the location of the reference point in the image and the orientation of the target in the image.

22. A method according to claim 21, wherein step (C) includes one or more of the following steps:
   i. applying a Hough line vision tool to the image to find an angle of edges in the image;
   ii. applying a Sobel edge tool to the image to generate Sobel angle image, generating a histogram of the angles represented in that Sobel angle image, and determining a one dimensional correlation thereof; and
   iii. inputting an orientation from the user.

23. A method according to claim 22, wherein step (D) includes one or more of the following steps:
   i. applying a Hough vision tool to the image to find an approximate location of edges therein, and finding an intersection of lines defined by those edges;
   ii. applying a projection tool vision tool to the image to find an approximate location of edges therein, and finding an intersection of lines defined by those edges;
   iii. applying a correlation vision tool to the image to find approximate coordinates of the reference point; and
   iv. determining a sum of absolute differences to find approximate coordinates of the reference point.

24. A method according to claim 23, wherein step (E) includes the step of invoking the steps in sequence, at least one time:
   i. applying a caliper vision tool along each of the expected edges in the image, where those edges are defined by a current estimate of the reference point location and a current estimate of the target orientation; and
   ii. fitting lines to edge points determined by the caliper vision tool.

25. A method according to claim 24, wherein step (E)(i) includes the step of applying the caliper vision tool along each of the expected edges until any of the following conditions is met: no edge is found by the caliper vision tool at a sample point; more than one edge is found by the caliper vision tool at a sample point; a distance between a sample edge point and a nominal line is larger than a threshold; or, the caliper vision tool window for the sample edge point extends outside of the image.

* * * * *